United States Patent [19]

Takahashi et al.

[11] Patent Number: 5,042,832
[45] Date of Patent: * Aug. 27, 1991

[54] PROPORTIONING VALVE ASSEMBLY AND ACTIVELY CONTROLLED SUSPENSION SYSTEM UTILIZING THE SAME

[75] Inventors: Kenro Takahashi; Naohiko Inoue; Masahiro Tsukamoto, all of Kanagawa, Japan

[73] Assignee: Nissan Motor Company, Limited, Yokohama, Japan

[*] Notice: The portion of the term of this patent subsequent to Aug. 14, 2007 has been disclaimed.

[21] Appl. No.: 302,252

[22] Filed: Jan. 27, 1989

[30] Foreign Application Priority Data

Jan. 29, 1988 [JP] Japan .............................. 63-10552[U]
Jan. 29, 1988 [JP] Japan .............................. 63-10555[U]

[51] Int. Cl.⁵ ............................................. B60G 11/26
[52] U.S. Cl. ............................... 280/707; 137/625.64
[58] Field of Search ................ 280/702, 707, 709, 710, 280/714; 137/625.64

[56] References Cited

U.S. PATENT DOCUMENTS

| | | | |
|---|---|---|---|
| 3,689,103 | 9/1972 | Meulendyk | 280/710 |
| 4,231,554 | 11/1980 | Ekonen et al. | 280/714 X |
| 4,266,572 | 5/1981 | Schuttenberg et al. | 137/625.64 X |
| 4,362,084 | 12/1982 | Walters | 137/625.64 X |
| 4,445,528 | 5/1984 | Miki et al. | 137/625.64 X |
| 4,741,364 | 5/1988 | Stoss et al. | 137/625.64 |
| 4,948,165 | 8/1990 | Takahashi et al. | 280/707 |

Primary Examiner—Charles A. Marmor
Assistant Examiner—Tamara L. Finlay
Attorney, Agent, or Firm—Foley & Lardner

[57] ABSTRACT

A proportioning valve assembly has a supply port through which a pressurized working fluid is supplied, a drain port through which a pressurized working fluid is drained, and a control port connected to a working chamber defined in a hydraulic cylinder disposed between a vehicular body and a suspension member rotatably supporting a vehicular wheel. The proportioning valve assembly further includes a valve member for adjusting working fluid pressure to be supplied to the working chamber via the control port. A flow restricting orifice is provided in the proportioning valve assembly. The flow restricting orifice employed is designed to provide variable flow restriction depending upon working fluid condition and/or the direction for achieving stabilization of pilot pressure or road shock absorption.

34 Claims, 5 Drawing Sheets

PROPORTIONING VALVE ASSEMBLY AND ACTIVELY CONTROLLED SUSPENSION SYSTEM UTILIZING THE SAME

BACKGROUND OF THE INVENTION

1. Field of the Invention

The present invention relates generally to a proportioning valve assembly for adjusting supply pressure of fluid, such as hydraulic working fluid and so forth, to a work so as to adjust the fluid pressure in the work. More specifically, the invention relates to a proportioning valve assembly which is applicable for a work which requires fluid pressure adjustment frequently with high response characteristics to adjust for pressure variation. The present invention also relates to an actively controlled suspension system which is disposed between a vehicular body and a vehicular wheel and is adjustable of suspension characteristics for regulating vehicular body height level and for suppressing attitude change of the vehicular body.

2. Description of the Background Art

Co-pending U.S. patent applications propose actively controlled suspension systems which generally achieve vehicular height regulation for maintaining vehicular height level at a predetermined height range and, as well, achieve attitude change suppression for better driving stability and riding comfort. Such actively controlled suspension systems employ proportioning valve assemblies in a pressure circuit for adjusting fluid pressure in working chambers defined within hydraulic cylinders disposed between vehicular bodies and suspension members rotatably supporting vehicular wheels.

Generally, the proportioning valve assembly employed in co-pending U.S. patent applications, is disposed within a hydraulic circuit connecting a pressurized working fluid source unit and the working chamber. The proportioning valve assembly comprises a three way spool valve or poppet valve which is supplied substantially constant line pressure from the pressurized working fluid source and output adjusting pressure is controlled by an electric actuator, such as an electrically driven proportioning solenoid and so forth. The actuator operates to adjust a pilot pressure to be exerted on the pressure controlling valve, such as the spool valve or poppet valve. A pilot chamber in which the pilot pressure is generated, is selectively connected to a control port connected to the working chamber of the hydraulic cylinder to receive therefrom the control pressure to be supplied to the working chamber as feedback pressure, and to a drain port for draining pressure to the pressurized working fluid source via a drain line.

In the pressure circuit between the proportioning valve assembly and the pressurized working fluid source, part of line pressure is directly fed back from a supply line to a drain line. This tends to generate back pressure in the drain line. When the pilot chamber is connected to the drain port for draining the pressurized fluid for reducing the pilot pressure, the back pressure tends to influence to the pressure in the pilot chamber and thus disturb pilot pressure. In order to avoid influence of the back pressure in the drain line, it is general technology to provide an orifice to restrict fluid flow therethrough.

The orifice in the known art comprises a singular projection projecting into the fluid path for reducing fluid flow path area and thereby increasing flow resistance. In case of the actively controlled suspension system, providing a singular orifice for preventing the influence of the back pressure in the drain line was not satisfactorily effective for stabilizing the pressure in the pilot chamber. Furthermore, flow restriction by means of the orifice causes lowering of response characteristics in adjustment of the pilot pressure. Because quick and high level response ability is required for the proportioning valve assembly employed in the actively controlled suspension system, the providing of an orifice creates a defect in the system in view of lowering of the response characteristics.

On the other hand, the proportioning valve assembly in the actively controlled suspension system is generally designed for absorbing road shock transmitted from the vehicular wheel. In the road shock absorbing operation, fluid pressure in the working chamber is drained through the proportioning valve in response to bounding shock for absorbing the bounding energy and is supplied through the proportioning valve in response to rebounding shock for absorbing rebounding energy. In order to achieve satisfactory road shock absorption, it is required to permit relatively large amount of fluid flow. In order to accomplish large amount of fluid supply for the working chamber in response to the bounding shock of a frequency close to vehicular body resonating frequency, a large pressurized working fluid supply capacity is required for the pressurized working fluid source unit. Since the pressurized fluid source unit generally comprises an engine driven fluid pump associated with an automotive engine to be driven by the output torque of the engine, a greater capacity pump to be employed in the pressurized working fluid source unit may cause greater load on the engine and increase power loss.

SUMMARY OF THE INVENTION

Therefore, it is an object of the present invention to provide a proportioning valve assembly which can solve the problems set out above.

Another object of the invention is to provide a proportioning valve assembly which can satisfactorily avoid influence of back pressure in a drain line without causing degradation of response characteristics.

A further object of the invention is to provide a proportioning valve assembly which can achieve road shock absorption without requiring a large capacity pressurized working fluid source unit.

A still further object of the invention is to provide an actively controlled suspension system which employs a proportioning valve assembly according to the present invention.

In order to accomplish aforementioned and other objects, a proportioning valve assembly, according to the present invention, has a supply port through which a pressurized working fluid is supplied, a drain port through which a pressurized working fluid is drained, and a control port connected to a working chamber defined in a hydraulic cylinder disposed between a vehicular body and a suspension member rotatably supporting a vehicular wheel. The proportioning valve assembly further includes a valve member for adjusting working fluid pressure to be supplied to the working chamber via the control port. A flow restricting means is provided in the proportioning valve assembly. The flow restricting means employed is designed to provide variable flow restriction depending upon working fluid condition and/or direction for achieving stabilization of a pilot pressure or road shock absorption.

According to one aspect of the invention, a proportioning valve assembly comprises:

a valve housing defining a first port connected to a pressurized working fluid source to receive pressurized working fluid therefrom, a second port connected to the pressurized working fluid source for returning the working fluid thereto, and a third port connected to a work for fluid communication therewith for adjusting working fluid pressure in the work;

a first valve body having one end facing a first chamber to be subject to a pilot pressure representative of a desired pressure in the work and the other end facing a second chamber to be subject to a feedback pressure which is fed back from the third port, the first valve body being movable according to pressure differnece between pilot pressure and the feedback pressure for selectively establishing fluid communication between the first, second and third ports of the valve housing;

a fluid path means defining a fluid path extending from the first port to the first chamber and from the first chamber to the second port;

a second valve means associated with the fluid path for providing flow restriction at a predetermined magnitude for generating the pilot pressure within the first chamber; and a first flow restricting means providing in the fluid path at a position downstream of the first chamber for restricting fluid flow therethrough, the flow restricting means having a flow restriction characteristics to serve for first smaller flow restriction for steady fluid flow and for second greater flow restriction for disturbed fluid flow.

The first flow restricting means may comprises a multi-stage orifice having a plurality of strip-like members respectively provided as a flow restricting orifice, the multi-stage orifice being so designed that the orifice of one of the strip-like members oriented at a most upstream side with respect to the fluid flow is effective to provide flow restriction for the steady flow and the orifices of all of the strip-like members are equally effective for flow restriction for the disturbed fluid flow.

If desired, the proportioning valve assembly may further comprise a second flow restricting means disposed in the fluid path at a position upstream of the first chamber, which second flow restricting means having a flow restriction characteristics to serve for first smaller flow restriction for steady fluid flow and for second greater flow restriction for disturbed fluid flow. The second flow restricting means comprises a multi-stage orifice having a plurality of strip-like members respectively provided as a flow restricting orifice, the multi-stage orifice being so designed that the orifice of one of the strip-like members oriented at a most upstream side with respect to the fluid flow is effective to provide flow restriction for the steady flow and the orifices of all of the strip-like members are equally effective for flow restriction for the disturbed fluid flow.

In the preferred construction, the proportioning valve assembly further comprises first and second spring means subjecting biasing forces for the one and the other ends of the first valve body for setting the first valve body at a position blocking fluid communication between the first, second and third ports when the pilot pressure and the feedback pressure balances. Furthermore, the proportioning valve assembly may further comprise a third flow restricting means provided within the second port for restricting fluid flow therethrough, the third flow restricting means being providing a flow restriction characteristics for providing greatest flow restriction against switching to a frequency of fluid flow substantially corresponding to a resonance frequency of the work. In the alternative, the proportioning valve assembly may further comprise a third flow restricting means provided within the third port for restricting fluid flow therethrough, the third flow restricting means providing a flow restriction characteristics for providing greatest flow restriction against switching to a frequency of fluid flow substantially corresponding to a resonance frequency of the work.

According to another aspect of the invention, a proportioning valve assembly comprises:

a valve housing defining a first port connected to a pressurized working fluid source to receive pressurized working fluid therefrom, a second port connected to the pressurized working fluid source for returning the working fluid thereto, and a third port connected to a work for fluid communication therewith for adjusting working fluid pressure in the work;

a first valve body having one end facing a first chamber to be subject to a pilot pressure representative of a desired pressure in the work and the other end facing a second chamber to be subject to a feedback pressure which is fed back from the third port, the first valve body being movable according to a pressure difference between pilot pressure and the feedback pressure for selectively establishing fluid communication between the the first, second and third ports of the valve housing;

a fluid path means defining a fluid path extending from the first port to the first chamber and from the first chamber to the second port;

a second valve means associated with the fluid path for providing flow restriction at a predetermined magnitude for generating the pilot pressure within the first chamber; and a first flow restricting means provided in at least one of the second and third port for providing flow restriction, the first flow restricting means providing a flow restriction characteristics for providing greatest flow restriction against switching to a frequency of fluid flow substantially corresponding to a resonance frequency of the work.

According to, a further aspect of the invention, an actively controlled suspension system comprises:

a hydraulic cylinder disposed between a vehicular body and a suspension member rotatably supporting a vehicular wheel, the hydraulic cylinder defining an internal space disposed therein a piston associated with one of the vehicular body and the suspension member via a piston rod, the piston defining a working chamber variable of pressure for varying suspension characteristics;

a hydraulic circuit connecting a pressurized working fluid source to the working chamber, the hydraulic circuit including a first line connected to a outlet of the pressurized working fluid source, a second line connected to an inlet of the pressurized working fluid source for returning working fluid therethrough, and a third line connected to the working chamber;

a proportioning valve assembly disposed within the hydraulic circuit and including a valve housing defining a first port connected to the first line to receive pressurized working fluid therefrom, a second port connected to the second line for returning the working fluid thereto, and a third port connected to the third line for fluid communication with the working chamber for adjusting working fluid pressure in the working chamber;

a first valve body having one end facing a first chamber to be subject to a pilot pressure representative of a desired pressure in the work and the other end facing a second chamber to be subject to a feedback pressure which is fed back from the third port, the first valve body being movable according to a pressure difference between pilot pressure and the feedback pressure for selectively establishing fluid communication between the first, second and third ports of the valve housing;

a fluid path means defining a fluid path extending from the first port to the first chamber and from the first chamber to the second port;

a second valve means associated with the fluid path for providing flow restriction at a predetermined magnitude for generating the pilot pressure within the first chamber; and a first flow restricting means provided in the fluid path at a position downstream of the first chamber for restricting fluid flow therethrough, the flow restricting means having a flow restriction characteristics to serve for first smaller flow restriction for steady fluid flow and for second greater flow restricting for disturbed fluid flow;

an actuator associated with the second valve means for controlling a position of the second valve means for adjusting the pilot pressure at a desired value; and control means for monitoring vehicular attitude change of the vehicular body for producing a control signal depending upon monitored magnitude of attitude change for suppressing the attitude change, the control means supplying the control signal to the actuator for operating the latter to adjust the position of the second valve means.

According to a still further aspect of the invention, an actively controlled suspension system comprises:

a hydraulic cylinder disposed between a vehicular body and a suspension member rotatably supporting a vehicular wheel, the hydraulic cylinder defining an internal space disposed therein a piston associated with one of the vehicular body and the suspension member via a piston rod, the piston defining a working chamber with variable pressure for varying suspension characteristics;

a hydraulic circuit connecting a pressurized working fluid source to the working chamber, the hydraulic circuit including a first line connected to a outlet of the pressurized working fluid source, a second line connected to an inlet of the pressurized working fluid source for returning working fluid therethrough, and a third line connected to the working chamber;

a proportioning valve assembly disposed within the hydraulic circuit and including a valve housing defining a first port connected to the first line to receive pressurized working fluid therefrom, a second port connected to the second line for returning the working fluid thereto, and a third port connected to the third line for fluid communication with the working chamber for adjusting working fluid pressure in the working chamber;

a first valve body having one end facing a first chamber to be subject to a pilot pressure representative of a desired pressure in the work and the other end facing a second chamber to be subject to a feedback pressure which is fed back from the third port, the first valve body being movable according to pressure difference between pilot pressure and the feedback pressure for selectively establishing fluid communication between the first, second and third ports of the valve housing;

a fluid path means defining a fluid path extending from the first port to the first chamber and from the first chamber to the second port;

a second valve means associated with the fluid path for providing flow restriction at a predetermined magnitude for generating the pilot pressure within the first chamber; and a first flow restricting means provided in at least one of the second and third port for providing flow restriction, the first flow restricting means providing a flow restriction characteristics for providing greatest flow restriction against switching to a frequency of fluid flow substantially corresponding to resonance frequency of the work;

an actuator associated with the second valve means for controlling a position of the second valve means for adjusting the pilot pressure at a desired value; and control means for monitoring vehicular attitude change of the vehicular body for producing a control signal depending upon monitored magnitude of attitude change for suppressing the attitude change, the control means supplying the control signal to the actuator for operating the latter to adjust the position of the second valve means.

BRIEF DESCRIPTION OF THE DRAWINGS

The present invention will be understood from the detailed description given herebelow and from the accompanying drawings of the preferred embodiments of the invention, which, however, should not be taken as limiting the invention to the specific embodiments, but are for explanation and understanding only.

In the drawings.

DESCRIPTION OF THE PREFERRED EMBODIMENT

Figure 1:
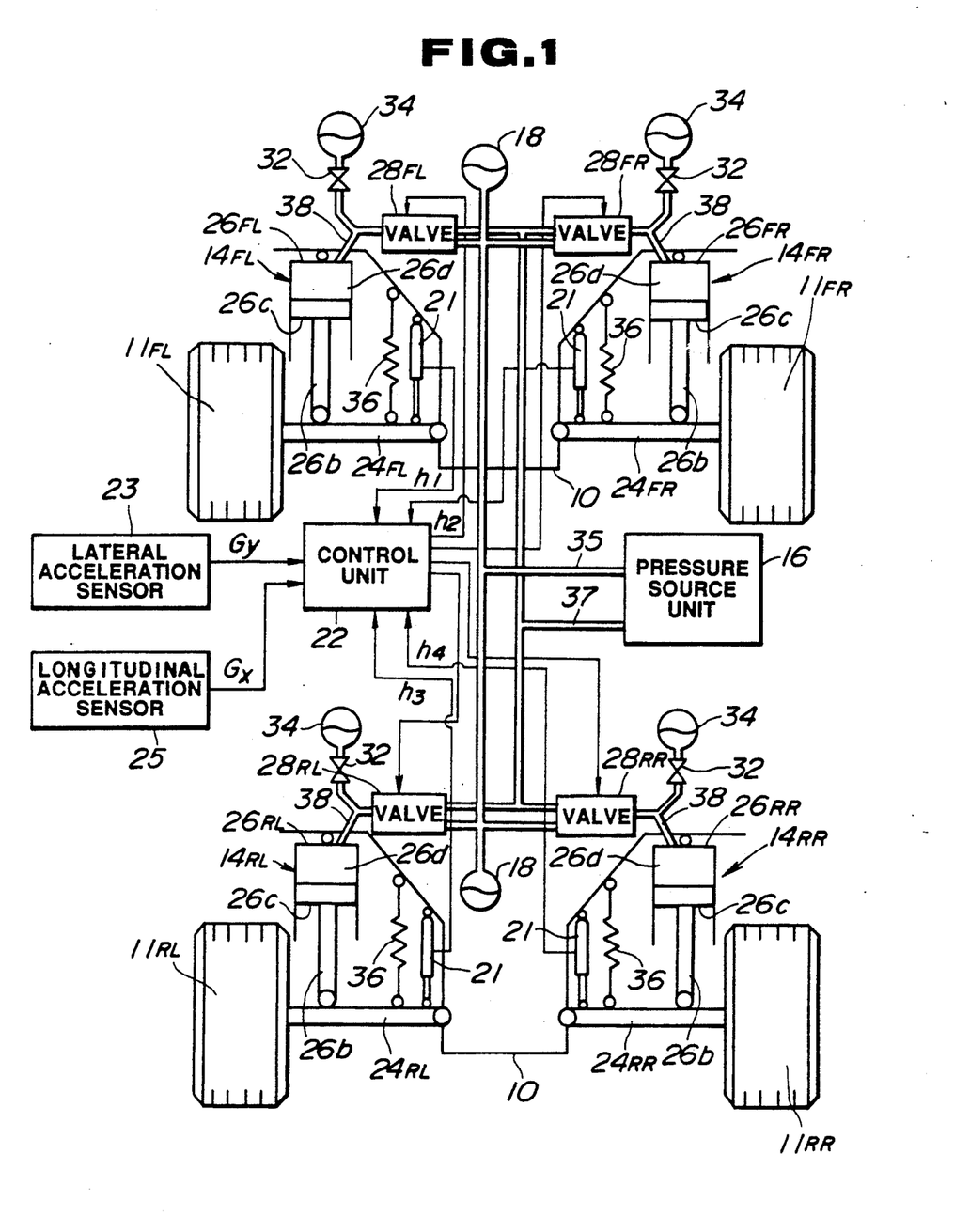
FIG. 1 is a diagrammatical illustration of the overall construction of the preferred embodiment of an actively controlled suspension system, according to the present invention, in which the preferred embodiment of a proportioning valve assembly is employed as a pressure control valve.

Referring now to the drawings, particularly to FIG. 1, the preferred embodiment of an actively controlled suspension system, according to the present invention, is designed to generally perform suspension control for regulating vehicular height level and vehicular attitude by suppressing relative displacement between a vehicular body 10 and suspension members 24FL, 24FR, 24RL and 24RR provided in front-left, front-right, rear-left and rear-right suspension mechanism 14FL, 14FR, 14RL and 14RR and rotatably supporting front-left, front-right, rear-left and rear-right wheels 11FL, 11FR, 11RL and 11RR. The suspension member will be hereafter represented by the reference numeral "24" as generally referred to. Similarly, the suspension mechanism as generally referred to will be hereafter represented by the reference numeral "14". Respective front-left, front-right, rear-left and rear-right suspension mechanism 14FL, 14FR, 14RL, and 14RR have hydraulic cylinders 26FL, 26FR, 26RL and 26RR which will be represented by the reference numeral "26" as generally referred to.

Each of the hydraulic cylinder 26 is disposed between the vehicular body 10 and the suspension member 24 to produce a damping force for suppressing relative displacement between the vehicular body and the suspension member. The hydraulic cylinder 26 generally comprises an essentially enclosed cylindrical cylinder body defining therein an enclosed chamber. A thrusting piston 26c is thrustingly and slidably disposed within the enclosed chamber of the hydraulic cylinder 26 for defining in the latter a working chamber 26d and a reference pressure chamber not shown. The working chamber 26d may be communicated with the reference pressure chamber via an orifice formed through the piston for fluid communication therebetween in an substantially restricted amount. The piston 26c is connected to the associated one of suspension member 24 via a piston rod 26b. A suspension coil spring 36 employed in the shown type of the suspension system is required for a resilient force necessary for maintaining the vehicular body about the suspension member.

The working chamber 26d of the hydraulic cylinder 26 is connected one of pressure control valves 28FL, 28FR, 28RL and 28RR via a pressure control line 38. The pressure control valve 28FL, 28FR, 28RL and 28RR will be hereafter represented by the reference numeral "28" as generally referred to. The pressure control valve 28 is, in turn, connected to a pressure source unit 16 via a supply line 35 and a drain line 37. A branch circuit is provided for connecting the pressure control line 38 to a pressure accumulator 34 via a flow restricting means, such as an orifice 32. Other pressure accumulation 18 are provided in the supply line 35 for accumulating the excessive pressure generated in the pressure source unit 16.

The pressure control valves 28 comprise, though it is not clearly shown in FIG. 1, electrically or electromagnetically operable actuators (reference is made to FIG. 2), such as a proportioning solenoid. The actuators are connected to a microprocessor based control unit 22. The control unit 22 is connected a plurality of vehicular height sensors 21 which are disposed in respectively associated suspension mechanisms and designed for monitoring relative position of the vehicular body 10 and the relevant suspension member 24 to produce a vehicular height level indicative signals $h_1$, $h_2$, $h_3$ and $h_4$. The control unit 22 is also connected to a lateral acceleration sensor 23, a longitudinal acceleration sensor 25 and so forth to receive the vehicle driving condition indicative parameters. Based on these control parameters, including the height level indicative signals, a lateral acceleration indicative signal $G_Y$ generated by the lateral acceleration sensor, a longitudinal acceleration indicative signal $G_x$ generated by the longitudinal acceleration sensor, and so forth, the control unit performs anti-rolling, anti-pitching and bouncing suppressive suspension controls.

While specific sensors are described with respect to the preferred embodiments, such as the vehicle height sensors which comprise a stroke sensor, the lateral acceleration sensor 23 and the longitudinal acceleration sensor 25, it is possible to use any other sensors which monitor vehicle driving parameters associated with suspension control. For instance, the stroke sensors employed in the shown embodiment can be replaced with one or more vertical acceleration sensors. Similarly, the lateral acceleration sensor may be replaced with a steering angle sensor for monitoring steering behaviour for assuming lateral force to be exerted on the vehicular body. In the later case, the parameter indicative of the steering angular displacement may be used in combination of a vehicular speed data since vehicular speed may influence rolling magnitude of the vehicle during steering operation.

Figure 2:
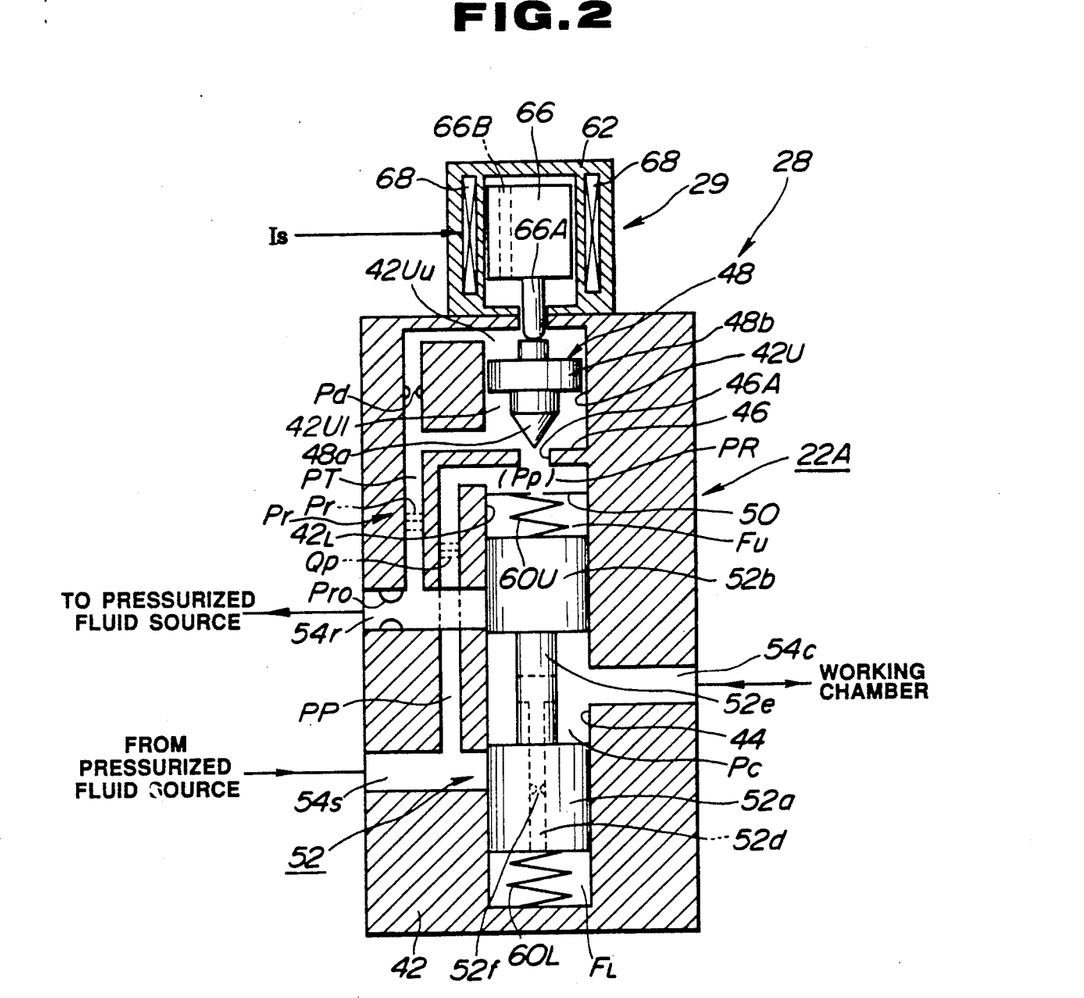
FIG. 2 is a sectional view of the preferred embodiment of the pressure control valve according to the present invention.

As shown in FIG. 2 in detail, the pressure control valve 28 comprises a proportioning valve assembly and is designed to be controlled by an electric current as a control signal supplied from the control unit 22 for varying valve position according to variation of the current value of the control signal. Generally, the pressure control valve 28 controls magnitude of introduction and draining of pressurized fluid into and from the working chamber 26d for adjusting the pressure in the working chamber. In the preferred embodiment illustrated in FIGS. 1 and 2, the working chamber 26d constitutes a work. As will be appreciated, the adjusted fluid pressure in the working fluid determines the damping force to be created in response to relative displacement between the vehicle body 10 and the suspension member 24. The mode of the suspension mechanism is varied according to variation of the fluid pressure in the working chamber between a predetermined hardest mode to most soft mode.

In the construction of the pressure control valve shown in FIG. 2, the pressure control valve 28 includes a valve housing 42. The valve housing 42 defines a valve bore 44 which is separated into a valve chamber 42L and a control chamber 42U by means of a partitioning wall 46. The partitioning wall 46 is formed with a communication path opening 46A for communication between the control chamber 42U and the valve chamber 42L. As seen from FIG. 2, the control chamber 42U and the valve chamber 42L are arranged in alignment to each other across the communication path opening 46A. In parallel to a section of the partitioning wall 46 extending perpendicular to the axis of the valve chamber 42L and the control chamber 42U, a fixed orifice defining partitioning member 50 is provided. The partitioning member 50 defines a throttling orifice which is oriented substantially in alignment with the communication path opening 46A. The partitioning wall 46 and the partitioning member 50 are cooperative for defining a pilot chamber PR therebetween.

A valve spool 52 is thrustingly and slidingly disposed within the valve chamber 42L. The valve spool 52 defines an upper feedback chamber FU between the tip end thereof and the partitioning member 50. The valve spool 52 also defines a lower feedback chamber FL between the other tip end thereof and the bottom of the valve chamber 42L. Offset springs 60U and 60L are disposed within the upper and lower feedback chambers FU and FL, which exert spring force to the valve spool 52 for resiliently restricting movement of the latter. Resilient force of the offset springs 60U and 60L are so set as to balance to place the valve spool 52 at a neutral position, when the fluid pressure in the upper and flow feedback chambers FU and FL balances to each other. The valve chamber 42L is communicated with a supply line 35 via an supply port 54s, a drain line 37 via a drain port 54r and a pressure control line 38 via a control port 54c. The supply port, drain port and control port are defined in the valve housing 42. The valve spool 52 at the aforementioned neutral position, blocks fluid communication of the pressure control chamber PC with any of the supply port 54s and the drain port 54r. As a result, as long as the valve spool 52 is maintained at the neutral position, overall fluid force in the hydraulic circuit downstream of the pressure control valve, which circuit includes the working chamber 26d of the hydraulic cylinder 26 is held constant.

The valve spool 52 is formed with lands 52a and 52b connected to each other via smaller diameter bar-like section 52e. The land 52a is oriented adjacent the lower feedback chamber FL so as to subject the tip end to the fluid pressure in the lower feedback chamber. Similarly, the land 52b is oriented adjacent the upper feedback chamber FU so as to subject the tip end to the fluid pressure in the upper feedback chamber. The bar-like section 52e between the lands 52a and 52b is cooperative with the peripheral wall of the valve chamber 42L in order to define therebetween a pressure control chamber PC. A fluid flow path 52d is formed through the valve spool 52. The fluid flow path 52d has one end communicated with the pressure control chamber PC and the other end communicated with the lower feedback chamber FL. A fixed flow restricting orifice 52f is formed in the fluid flow path 52d for restricting fluid flow therethrough.

A poppet valve member 48 is disposed within the control chamber 42U for thrusting movement therein. The poppet valve member 48 has a valve head 48a of an essentially conical configuration. The valve head 48a opposes the communication path opening 46A of the partitioning wall 46. The poppet valve member 48 is operably associated with a proportioning solenoid assembly 29 as the actuator. The proportioning solenoid assembly 29 comprises a housing 62 rigidly secured on the valve housing 42 and defining an internal space to receive therein a plunger 66. The plunger 66 has a plunger rod 66A. The tip end of the plunger rod 66A is kept in contact with the tip end of the poppet valve member 48 remote from the valve head 48a. Therefore, the poppet valve member 48 is axially driven by means of the plunger 66 to control the path area in the communication path opening 46A according to the position of the tip end of the plunger rod 66A. Adjusting of the path area in the communication path opening 46A results in variation of fluid pressure to be introduced into the pilot chamber PR.

In order to control the position of the plunger 66 with the plunger rod 66A, a proportioning solenoid coil 68 is housed within the housing 62 and surrounds the plunger 66. The interior space of the housing 62 is connected to the control chamber 42U for fluid communication therebetween. The plunger 66 is formed with a fluid path 66B for fluid communication between upper and lower sections of the interior space. Therefore, the fluid pressure in the upper and lower sections of the interior space of the housing 62 is held equal to the pressure in the control chamber 42U. This cancels fluid pressure to be exerted on the poppet valve and the plunger so that the position of the tip end of the plunger rod 66A can be determined solely depending upon the energization current $I_s$ of the proportioning solenoid coil 68.

As seen from FIG. 2, the poppet valve member 48 has a cylindrical larger diameter section 48b for separating the control chamber 42U into upper section and lower section 42Uu and 42Ul. The upper and lower sections 42Uu and 42Ul are communicated with the drain port 54r via a pilot return path PT. A multi-stage orifice Pr is provided in the pilot return path PT for restricting fluid flow therethrough. The multi-stage orifice Pr comprises a plurality of strips formed with through openings and is so designed that one of the orifices oriented at most upstream side is mainly effective for restricting fluid flow when fluid flowing therethrough is steady flow and that all of the orifices of respective strips are equally effective for restricting fluid flow when fluid flow therethrough is disturbed and not steady. Therefore, as will be appreciated herefrom, the multi-stage orifice Pr employed in the shown embodiment serves to provide greater fluid flow restriction against non-steady or disturbed fluid flow than that for the steady flow. As seen from FIG. 2, the multi-stage orifice Pr is provided upstream of the upper and lower sections 42Uu and 42Ul. On the other hand, a fixed throttling orifice Pd is provided at an orientation downstream of the lower section 42Ul and upstream of the upper section 42Uu. Similarly, the pilot chamber PR is communicated with the supply port 54s via a pilot path PP. A multi-stage orifice Qp which has similar construction and flow restricting function to that of the multi-stage orifice Pr is provided in the pilot path PP.

A fixed throttle orifice Pro is also provided in the drain port 54r for restricting fluid flow therethrough. The diameter of the fluid path at the orifice Pro is so selected as to create great flow restriction against pulsatile fluid flow cyclically varying the fluid pressure at a frequency approximately 1 Hz.

Figure 3:
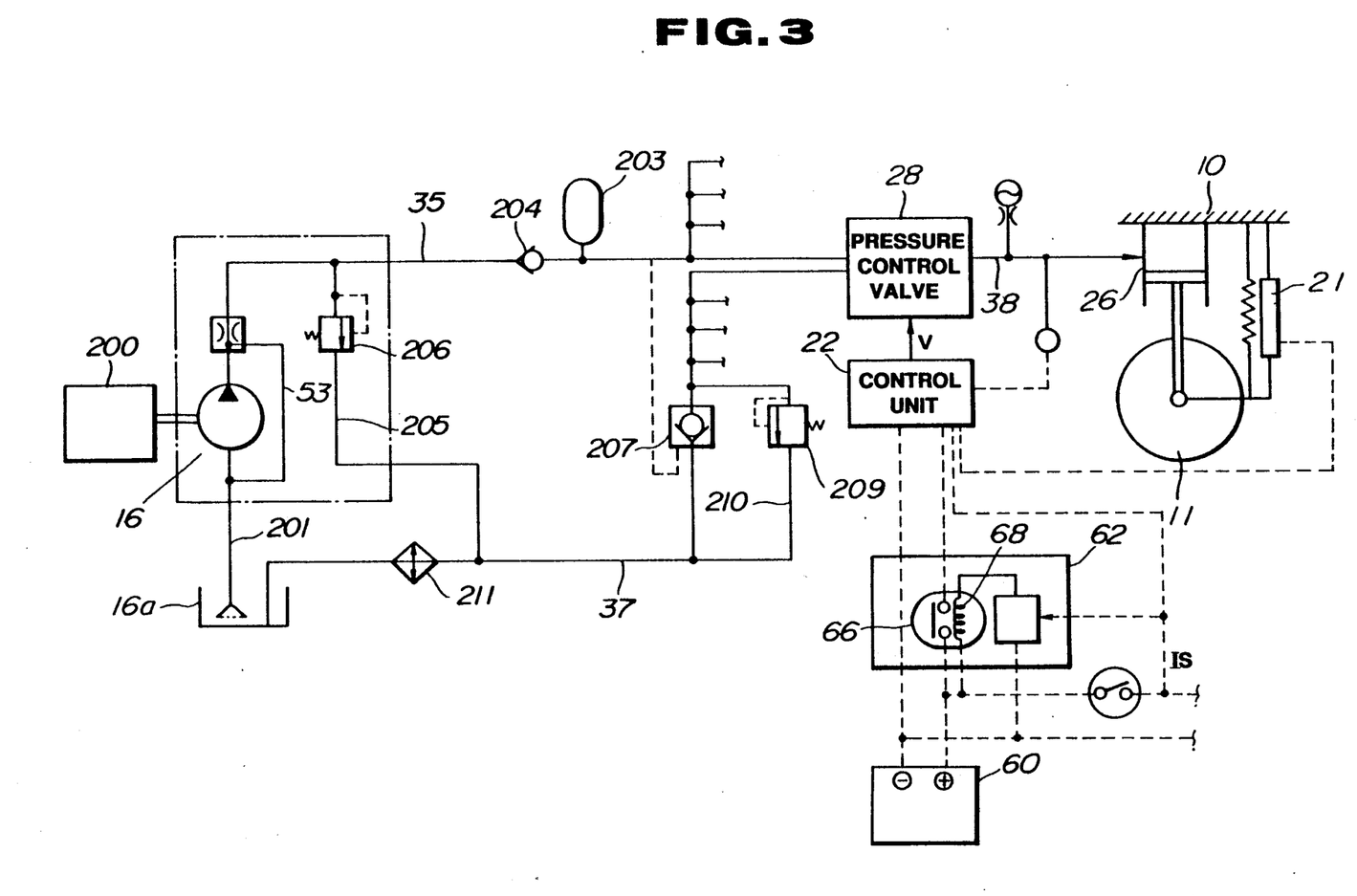
FIG. 3 is a circuit diagram of one example of a hydraulic circuit which is applicable for the actively controlled suspension system according to the present invention.

FIG. 3 shows a detailed circuit construction of one example of hydraulic circuit which is applicable for the shown embodiment of the actively controlled suspension system, according to the present invention. The pressure source unit includes the pressure unit 16 which comprises a fluid pump, and is connected to a fluid reservoir 16a via a suction pipe 201. The fluid pump 16 is associated with an automotive engine 200 so as to be driven by the output torque of the latter. The outlet of the pressure unit 16, through which the pressurized working fluid is discharged, is connected to the supply port 54s of the pressure control valve 28 via the supply line 35. A pressure regulating orifice 202 is disposed in the supply line 35 for suppressing pulsatile flow of the working fluid and thereby regulate the output pressure of the pressure unit 16 to be delivered to the pressure control valve 28. A feedback line 53 is connected to upstream of the pressure regulating orifice 202 at one end. The other end of the feedback line 39 is connected the upstream of the inlet of the pressure unit 16 and the orifice so that excessive fluid between the pressure unit 16 and the orifice 202 is fed back to the inlet side of the pressure unit.

A pressure accumulator 203 is also connected to the supply line 35 to receive therefrom the pressurized fluid for accumulating the pressure. An one-way check valve 204 is disposed in the supply line 35 at the position upstream of the junction between the pressure accumulator 203 and the supply line 35.

A pressure relief line 205 is also connected to the supply line 35 at the position intermediate between the pressure regulating orifice 202 and the one-way check valve 204, at one end. The other end of the pressure relief line 205 is connected to the drain line 37. A pressure relief valve 206 is disposed in the pressure relief line 205. The pressure relief valve 206 is responsive to the fluid pressure in the supply line 35 higher than a given value to drain port of the working fluid to the drain line for maintaining the pressure in the supply line 35 below the given pressure value.

On the other hand, a shut-off valve 207 is disposed in the drain line 37. The shut-off valve 207 is also connected to the supply line 35 downstream of the one-way check valve 204 to receive therefrom the pressure in the supply line as a pilot pressure, via a pilot line 208. The shut-off valve 207 is designed to be maintained at open position as long as the pilot pressure to be introduced through the pilot line 208 is held at a pressure level higher than or equal to a given pressure level. At the open position, the shut-off valve maintains fluid communication between the inlet side and outlet side thereof so that the working fluid in the drain line 37 may flow therethrough to the reservoir tank 16a. On the other hand, the shut-off valve 207 is responsive to pilot pressure drops below the given pressure level to be switched into shut-off position. At the shut-off position, the shut-off valve blocks fluid communication between the drain port 54r of the pressure control valve 28 and the reservoir tank 16a.

In parallel to the shut-off valve 207, a pressure relief valve 209 is provided. The pressure relief valve 209 is disposed in a by-pass line 210 connecting the upstream side and downstream side of the shut-off valve 207. The pressure relief valve 209 is normally held at closed position to block fluid communication therethrough. On the other hand, the pressure relief valve 209 is responsive to a fluid pressure in the drain line 37 upstream thereof, higher than a set pressure, e.g. 30 kgf/cm$^2$, in order to establish fluid communication between the upstream side and the downstream side of the shut-off valve 207 to allow the excessive pressure at the upstream side drain line 37 to be drained therethrough. Therefore, the pressure relief valve 209 limits maximum pressure at the set pressure. The set pressure of the pressure relief valve 209 corresponds to a predetermined offset pressure.

An oil cooler 211 is disposed in the drain line 37 for cooling the working fluid returning to the reservoir tank 16a.

In the hydraulic circuit set forth above, the fluid pump 16 is driven by the engine 200 to discharge pressurized working fluid while the engine is running. The pressurized fluid discharged from the outlet of the fluid pump 16 is fed to the pressure control valve 28 via the supply line 35 including the pressure regulating orifice 202 and the one-way check valve 204. When the pressure control valve 28 is shifted to establish fluid communication between the supply port 54s and the pressure control port 54c from the valve position shown in FIG. 2, the pressurized working fluid passes the pressure control valve 28 and is introduced into the working chamber 26d of the hydraulic cylinder 26. On the other hand, when the pressure control valve 28 is shifted to block fluid communication between the supply port 54s and the pressure control chamber PC, the fluid pressure in the supply line 35 increases. When the line pressure in the supply line 35 becomes higher than or equal to the set pressure of the pressure relief valve 206 in the pressure relief line 205, the excessive pressure is fed to the drain line 37 via the pressure relief valve 206 and thus returned to the reservoir tank 16a.

The fluid pressure in the supply line 35 is also fed to the shut-off valve 207 via a pilot line 208. As set forth, the shut-off valve 207 is placed at open position as long as the pilot pressure introduced through the pilot line 208 is held higher than or equal to the set pressure thereof. Therefore, fluid communication between the pressure control valve 28 and the reservoir tank 16a is maintained. At this position, the working fluid is thus returned to the reservoir tank 16a via the drain line 37 via the shut-off valve 207 and the oil cooler 211.

The shut-off valve 207, even at the open position, serves as a resistance to the fluid flow. Therefore, the fluid pressure in the drain line 37 upstream of the shut-off valve 207 becomes higher, i.e. higher than the offset pressure $P_0$. Then, the pressure relief valve 209 becomes active to open for allowing the excessive pressure of the working fluid to flow through the by-pass line 210.

When the engine stops, the pressure unit 16 ceases operation. By stopping the pressure unit 16, the working fluid pressure in the supply line 35 drops. According to the drop of the pressure in the supply line 35, the pilot pressure to be exerted to the shut-off valve 207 via the pilot line 208 drops. When the pressure in the pilot line 208 drops below or equal to the set pressure, the shut-off valve 207 is switched into shut-off position to block fluid communication therethrough. As a result, the fluid pressure in the drain line 37 upstream of the shut-off valve 207 becomes equal to the pressure in the working chamber 26d. Therefore, even when the working fluid leaks through a gap between the spool valve 52 and the inner periphery of the valve bore, it does not affect the fluid pressure in the working chamber.

Figure 4:
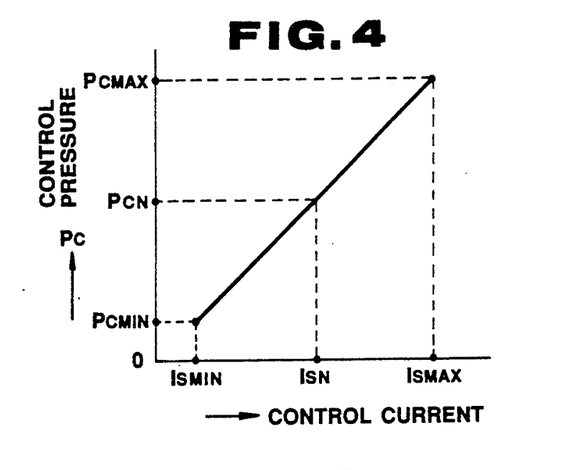
FIG. 4 is a chart showing a relationship between an electric current value of a control signal to be supplied for an actuator of the pressure control valve and a working fluid pressure supplied to a working chamber of a hydraulic cylinder.

FIG. 4 shows variation of the working fluid pressure in the working chamber 26d of the hydraulic cylinder 26 according to variation of the current value $I_s$ of the control signal applied to the actuator 29 of the pressure control valve 28. As seen from FIG. 4, the hydraulic pressure in the working chamber 26d varies between a maximum pressure $P_{cmax}$ which is saturation pressure of the pressure source unit 16 and a minimum pressure $P_{cmin}$ which is set at a magnitude in view of a noise component to be contained in the control signal. As seen from FIG. 4, the maximum pressure $P_{cmax}$ corresponds to the maximum current value $I_{smax}$ of the control signal and the minimum pressure $P_{cmin}$ corresponds to the minimum current value $I_{smin}$ of the control signal. Furthermore, the hydraulic pressure level as labeled $P_{cn}$ represents neutral pressure at the neutral current $I_{sn}$. As seen, the neutral current $I_{sn}$ is set at an intermediate value between the maximum and minimum current values $I_{smax}$ and $I_{smin}$.

Operation of the aforementioned pressure control valve 28 in terms of control of suspension characteristics and absorption of road shock will be discussed herebelow.

In general, the pressurized working fluid source unit 16 supplies the predetermined line pressure. For example, the line pressure in the supply line 35 may be set at a pressure of 80 kgf/cm$^2$.

When the vehicle steadily travels on a smooth straight road, the current value of the control signal to be applied to the actuator 29 of the pressure control valve 28 is maintained at the neutral value $I_{sn}$. As long as the neutral value $I_{sn}$ of the control signal is applied to the actuator 29, the proportioning solenoid coil 68 is energized at a magnitude corresponding the neutral value $I_{sn}$ of the control signal to place the poppet valve 48 at the corresponding position. At this position, the flow resistance at the communication path opening 46A, the path area of which is restricted by the valve head 48a of the poppet valve 48, becomes the neutral value. At this position of the poppet valve 48, the pilot pressure $P_p$ within the pilot chamber PR is maintained at the neutral pressure $P_n$. At this condition, if the fluid pressure of the control pressure Pc in the pressure control port 54c is held equal to the fluid pressure in the working chamber 26d of the hydraulic cylinder 26, the fluid pressure in the upper and lower feedback chambers FU and FL are held in balance to each other. The valve spool 52 is maintained at the neutral position to shut fluid communication between the supply port 54s, the drain port 54r and the pressure control port 54c. Therefore, the control pressure Pc is maintained at the neutral pressure $P_{cn}$.

At this condition, a relatively high frequency and small magnitude road shock, input through the vehicular wheel, is absorbed by fluid communication between the working chamber 26d and the pressure accumulator 34 via the orifice 32. The flow restriction in the orifice 32 serves to absorb the bounding and rebounding energy. Therefore, high frequency and small magnitude road shock can be effectively absorbed so as not to be transmitted to the vehicle body.

When the piston 26c strokes in a rebounding direction compressing the working chamber 26d, the fluid pressure in the working chamber increases to increase the control pressure Pc in the pressure control port 54c. Therefore, the control pressure Pc becomes higher than the pilot pressure Pp in the pilot chamber PR. This results in increasing of the fluid pressure in the lower feedback chamber FL to a magnitude higher than that in the upper feedback chamber FU. This causes upward movement of the valve spool 52 to establish fluid communication between the drain port 54r and the pressure control port 54c. Therefore, the pressure in the pressure control port 54c is drained through the drain line 37. This causes pressure drop at the pressure control port 54c so that the control pressure Pc becomes lower than the pilot pressure Pp in the pilot chamber PR. Then, the fluid pressure in the upper feedback chamber FU becomes higher than that in the lower feedback chamber FL. Therefore, the valve spool 52 is shifted downwardly to establish fluid communication between the supply port 54s and the pressure control port 54c. The pressurized working fluid in the supply line 35 is thus supplied to the working chamber 26d via the pressure control port 54c to increase the fluid pressure. By repeating the foregoing cycles, pressure balance is established between the pressure control port 54c and the pilot chamber PR. Therefore, the control pressure Pc as well as the fluid pressure in the working chamber 26d are adjusted to the pilot pressure.

During the pressure adjusting operation set forth above, the fixed throttling orifice Pro serves for restricting fluid flow from the pressure control port 54c to the drain line 37. This flow restriction at the orifice Pro serves as resistance against the rebounding stroke of the piston 26c to damp or absorb energy causing rebounding motion of the vehicle body. Furthermore, as set out, working fluid in the pilot chamber PR is generally introduced through the pilot path PP via the multi-stage orifice Qp and return through the pilot return path PT via the lower section 42Ul of the control chamber 42U and via the multi-stage orifice Pr. As long as the fluid flow in the pilot return path PT is not disturbed and is thus steady, the most upstream side orifice Pr' is mainly effective for restricting the fluid flow. Therefore, the magnitude of flow restriction is relatively small so as to provide sufficient response characteristics in reduction of the pilot pressure. On the other hand, when the working fluid flowing from the control chamber 42U is confluent with the working fluid from the pilot chamber PR, back pressure is produced in the drain port 54r, and the fluid flowing through the pilot return path PT is distrubed and thus becomes unstable. This tends to cause serving of the pressurized fluid from the drain port 54r to the pilot chamber PR. In such case, all of the orifices in the multi-stage orifice Pr is effective to create greater flow restriction that than for the steady flow. This avoids influence of the back pressure created in the drain port 54r.

Similarly, in response to the bounding stroke of the piston 26c, the valve spool 52 is shifted up and down to absorb bounding energy and maintains the fluid pressure in the working chamber 26d of the hydraulic cylinder 26 at the neutral pressure.

On the other hand, when anti-rolling suspension control is taking place in response to the lateral acceleration exerted on the vehicle body, the control signal current value is derived on the basis of the magnitude of the lateral acceleration monitored by the lateral acceleration sensor 23. Generally, in order to suppress rolling motion of the vehicular body, the fluid pressure in the working chamber 26d of the hydraulic cylinder 26 which is provided for the suspension mechanism at the side where the vehicular height is lowered across the neutral position, is increased to suppress lowering motion of the vehicle body. On the other hand, the fluid pressure in the working chamber 26d of the hydraulic cylinder 26 which is provided for the suspension mechanism at the side where the vehicular height has risen across the neutral position, is decreased to suppress rising motion of the vehicle body. Therefore, in order to control the pressures in the working chambers 26d of the both side hydraulic cylinders 26, control signal current values are increased and decreased across the neutral value $I_{sn}$.

For example, when rolling motion is caused by left turn of the vehicle, control current for the actuators 29 of the pressure control valves 28 controlling the fluid pressures in the front-right and rear-right hydraulic cylinders 26FR and 26RR are increased to be greater than the neutral current $I_{sn}$, and the control current for the actuator of the pressure control valves 28 controlling the fluid pressures in the front-left and rear-left hydraulic cylinders 26FL and 26RL are to be decreased smaller than the neutral current $I_{sn}$. By the control current supplied to respective actuators 29, the proportioning solenoid coils 68 are energized at the magnitudes corresponding to the control signal currents to place the poppet valves 48 at respective corresponding positions. By variation of the positions of the poppet valves 48, flow restriction magnitude at respective communication path openings 46A is varied to vary the pilot pressures Pp in the pilot chamber PR. As set forth, since the fluid pressures in the working chambers 26d become equal to the pilot pressures Pp, the suspension characteristics at respective hydraulic cylinders 26 can be adjusted.

Anti-pitching, bouncing suppressive suspension control can be performed substantially in the same manner to that discussed with respect to the anti-rolling control.

Figure 5:
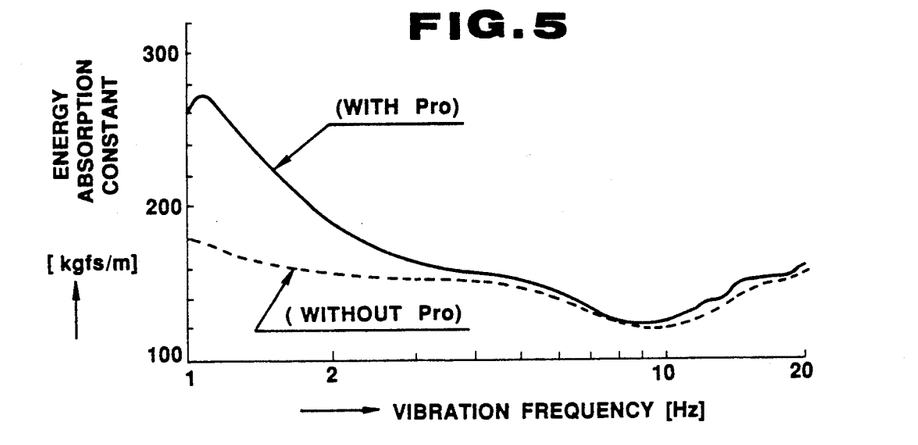
FIG. 5 is a chart showing a relationship between a frequency of road shock and a road shock absorbing constant.
Figure 6:
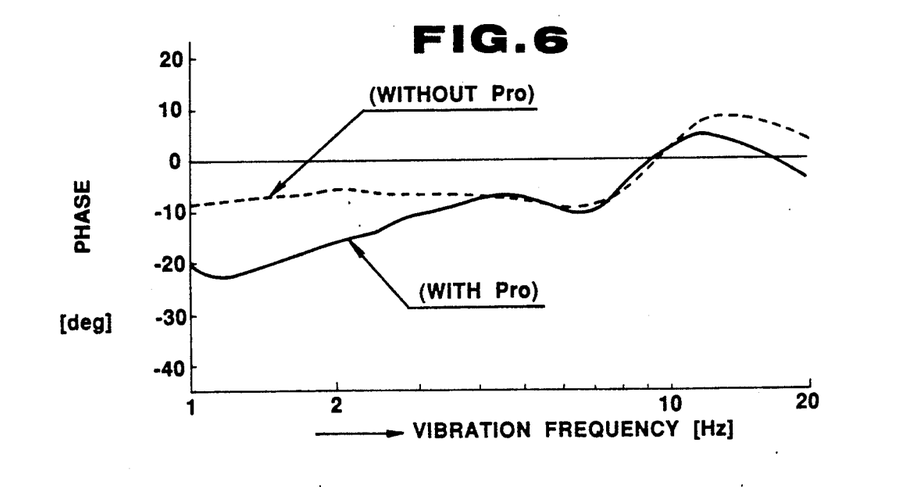
FIG. 6 is a chart showing a relationship between a frequency of road shock and phase.

FIGS. 5 and 6 show variation of bounding and rebounding energy absorption constant (kgfs/m) and phase (degree) in relation to the vibration frequency. In FIGS. 5 and 6, solid lines shows variation characteristics of the bounding and rebounding energy absorption constant and phase when the orifice Pro is provided and broken line shows the variation characteristics when the orifice Pro is not provided. As can be seen from FIG. 5, when the orifice Pro is provided, a greater bounding and rebounding energy absorption constant than that having no orifice at the drain port can be obtained particularly in a frequency range of 1 to 2 Hz which corresponds to resonance frequency of the vehicular body. With this vibration absorbing characteristic provided for the suspension system, a substantial reduction of the vibration energy to be transmitted to the vehicle body can be achieved. Therefore, with the shown embodiment, a substantial improvement in riding comfort of the vehicle can be accomplished.

On the other hand, when the orifice Pro is provided, a substantial phase shift is observed in the vibration frequency band approximately corresponding to the resonance range of the vehicle body. However, in the relatively low frequency range, phase shift will not cause substantial degradation of suspension performance. On the other hand, as seen from FIG. 6, since the phase shift in the high frequency range is equivalent to that without an orifice Pro, the influence of the phase shift will be the equivalent level to that without an orifice Pro.

As will be appreciated herefrom, the shown embodiment can achieve substantial improvement by providing the orifice Pro in the drain port of the pressure control valve.

The multi-stage orifices Pr in the pilot return path PT and the multi-stage orifice Qp in the pilot path PP are effective for avoiding disturbance of the pilot pressure Pp in the pilot chamber PR even during back pressure due to fluid flowing through the drain port causing disturbance of fluid flow.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

Figure 7:
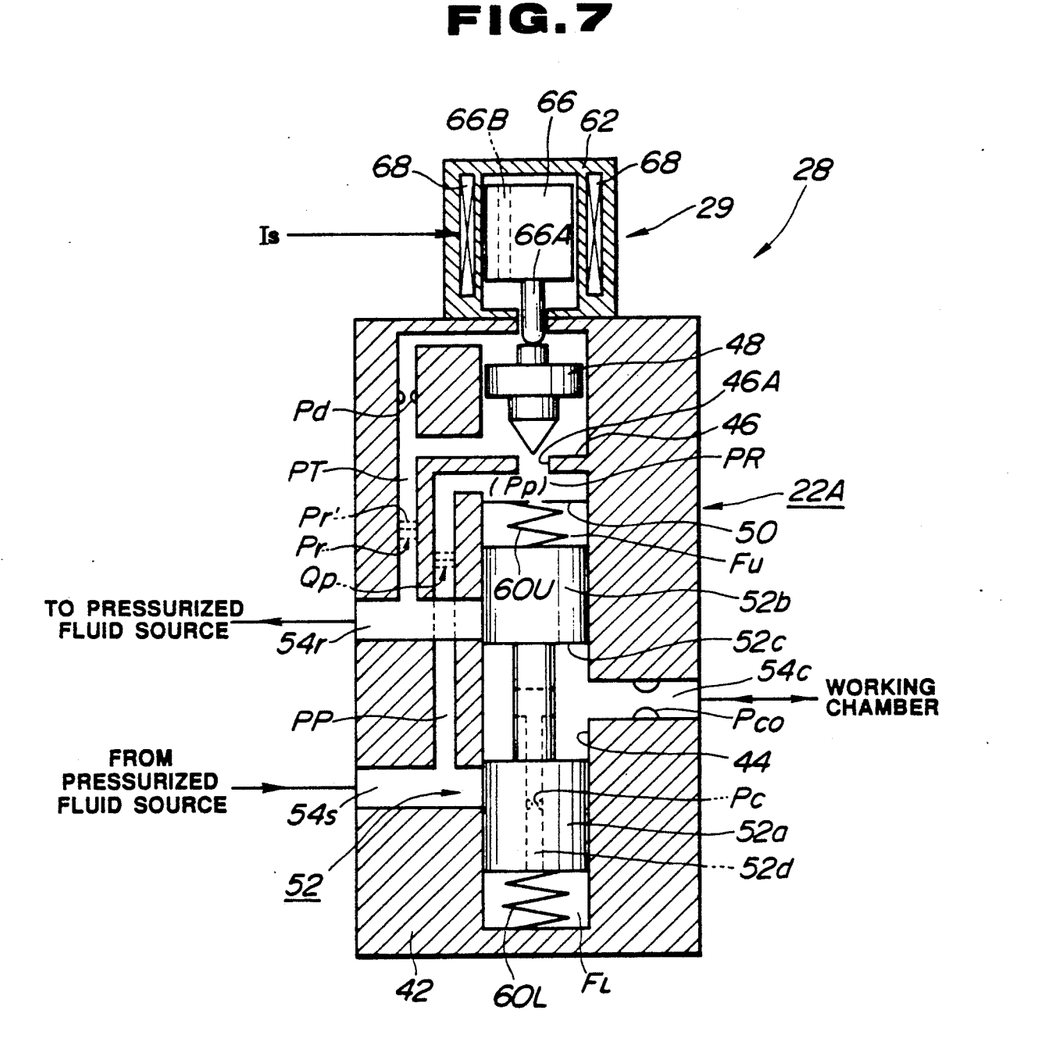
FIG. 7 is a sectional view of another embodiment of a pressure control valve according to the invention, which is applicable for the actively controlled suspension system of FIG. 1.

For instance, though the foregoing embodiment provides the orifice Pro for restricting fluid flow through the drain port 54r, the similar effect can be obtained by providing the orifice Pco in the pressure control port 54c as shown in FIG. 7.

Furthermore, though the shown embodiment of the proportioning valve assembly has been disclosed in terms of the hydraulic suspension system, it may be applicable for any fluid systems, such as a pnuematic system, hydropneumatic system and so forth.

What is claimed is:

1. A proportioning valve assembly comprising:
   a valve housing defining a first port connected to a pressurized working fluid source to receive pressurized working fluid therefrom, a second port connected to said pressurized working fluid source for returning the working fluid thereto, and a third port connected to a work for fluid communication therewith for adjusting working fluid pressure in said work;
   a first valve body having one end facing a first chamber to be subject to a pilot pressure representative of a desired pressure in said work and the other end facing a second chamber to be subject a feedback pressure which is fed back from said third port, said first valve body being movable according to a pressure difference between pilot pressure and said feedback pressure for selectively establishing fluid communication between said said first, second and third ports of said valve housing;
   a fluid path defining a path extending from said first port to said first chamber and from said first chamber to said second port;
   a second valve means associated with said fluid path for providing flow restriction at a predetermined magnitude for generating said pilot pressure within said first chamber; and
   a first flow restricting means provided in said fluid path at a position downstream of said first chamber for restricting fluid flow therethrough, said flow restricting means having flow restriction characteristics to serve for first smaller flow restriction for steady fluid flow and for second greater flow restriction for disturbed fluid flow.

2. A proportioning valve assembly as set forth in claim 1, wherein said first flow restricting means comprises a multi-stage orifice having a plurality of strip-like members respectively providing a flow restricting orifice, said multi-stage orifice being so designed that orifice of one of said strip-like members oriented at a most upstream side with respect to fluid flow is effective to provide flow restriction for steady flow and orifices of all of said strip-like members are equally effective for flow restriction for disturbed fluid flow.

3. A proportioning valve assembly as set forth in claim 2, which further comprises a second flow restricting unit disposed in said fluid path at a position upstream of said first chamber, said second flow restricting unit having flow restriction characteristics to serve for first smaller flow restriction for steady fluid flow and for second greater flow restriction for disturbed fluid flow.

4. A proportioning valve assembly as set forth in claim 3, wherein said second flow restricting unit comprises a multi-stage orifice having a plurality of strip-like members respectively providing a flow restricting orifice, said multi-stage orifice being so designed that an orifice of one of said strip-like members oriented at a most upstream side with respect to fluid flow is effective to provide flow restriction for steady flow and orifices of all of said strip-like members are equally effective for flow restriction for disturbed fluid flow.

5. A proportioning valve assembly as set forth in claim 1, which further comprises a second flow restricting unit disposed in said fluid path at a position upstream of said first chamber, said second flow restricting unit having flow restriction characteristics to serve for first smaller flow restriction for steady fluid flow and for second greater flow restriction for disturbed fluid flow.

6. A proportioning valve assembly as set forth in claim 5, wherein said second flow restricting unit comprises a multi-stage orifice having a plurality of strip-like members respectively providing a flow restricting orifice, said multi-stage orifice being so designed that an orifice of one of said strip-like members oriented at a most upstream side with respect to fluid flow is effective to provide flow restriction for steady flow and orifices of all of said strip-like members are equally effective for flow restriction for disturbed fluid flow.

7. A proportioning valve assembly as set forth in claim 1, which further comprises first and second springs subjecting biasing forces to said one and the other ends of said first valve body for setting said first valve body at a position blocking fluid communication between said first, second and third ports when said pilot pressure and said feedback pressure balances.

8. A proportioning valve assembly as set forth in claim 1, which further comprises a third flow restricting means provided within said second port for restricting fluid flow therethrough, said third flow restricting means providing flow restriction characteristics for providing greatest flow restriction against a switching frequency of fluid flow direction substantially corresponding to a resonance frequency of said work.

9. A proportioning valve assembly as set forth in claim 1, which further comprises a third flow restricting means provided within said third port for restricting fluid flow therethrough, said third flow restricting means providing flow restriction characteristics for providing greatest flow restriction against a switching frequency of fluid flow direction substantially corresponding to a resonance frequency of said work.

10. A proportioning valve assembly comprising:
a valve housing defining a first port connected to a pressurized working fluid source to receive pressurized working fluid therefrom, a second port connected to said pressurized working fluid source for returning working fluid thereto, and a third port connected to a work for fluid communication therewith for adjusting working fluid pressure in said work;
a first valve body having one end facing a first chamber to be subject to a pilot pressure representative of a desired pressure in said work and the other end facing a second chamber to be subject to a feedback pressure which is fed back from said third port, said first valve body being movable according to a pressure difference between pilot pressure and said feedback pressure for selectively establishing fluid communication between said first, second and third ports of said valve housing;
a fluid path defining a path extending from said first port to said first chamber and from said first chamber to said second port;
a second valve means associated with said fluid path for providing flow restriction at a predetermined magnitude for generating said pilot pressure within said first chamber; and
a first flow restricting means in at least one of said second and third port for providing flow restriction, said first flow restricting means providing flow restriction characteristics for providing greatest flow restriction against a switching frequency of fluid flow direction substantially corresponding to a resonance frequency of said work.

11. A proportioning valve assembly as set forth in claim 10, which further comprises a second flow restricting means disposed within a fluid path at a position downstream of said first chamber for restricting fluid flow therethrough, said second flow restricting means having flow restriction characteristics to serve for first smaller flow restriction for steady fluid flow and for second greater flow restriction for disturbed fluid flow.

12. A proportioning valve assembly as set forth in claim 11, wherein said second flow restricting means comprises a multi-stage orifice having a plurality of strip-like members respectively providing a flow restricting orifice, said multi-stage orifice being so designed that an orifice of one of said strip-like members oriented at a most upstream side with respect to fluid flow is effective to provide flow restriction for steady flow and orifices of all of said strip-like members are equally effective for flow restriction for disturbed fluid flow.

13. A proportioning valve assembly as set forth in claim 12, which further comprises a third flow restricting unit disposed in said fluid path at a position upstream of said first chamber, said third flow restricting unit having flow restriction characteristics to serve for first smaller flow restriction for steady fluid flow and for second greater flow restriction for disturbed fluid flow.

14. A proportioning valve assembly as set forth in claim 13, wherein said third flow restricting unit comprises a multi-stage orifice having a plurality of strip-like members respectively providing a flow restricting orifice, said multi-stage orifice being so designed that an orifice of one of said strip-like members oriented at a most upstream side with respect to fluid flow is effective to provide flow restriction for steady flow and orifices of all of said strip-like members are equally effective for flow restriction for disturbed fluid flow.

15. A proportioning valve assembly as set forth in claim 10, which further comprises a third flow restricting unit disposed in said fluid path at a position upstream of said first chamber, said third flow restricting unit having flow restriction characteristics to serve for first smaller flow restriction for steady fluid flow and for second greater flow restriction for disturbed fluid flow.

16. A proportioning valve assembly as set forth in claim 15, wherein said third flow restricting unit comprises a multi-stage orifice having a plurality of strip-like members respectively providing a flow restricting orifice, said multi-stage orifice being so designed that an orifice of one of said strip-like members oriented at a most upstream side with respect to fluid flow is effective to provide flow restriction for steady flow and orifices of all of said strip-like members are equally effective for flow restriction for disturbed fluid flow.

17. A proportioning valve assembly as set forth in claim 10, which further comprises first and second springs subjecting biasing forces to said one and the other ends of said first valve body for setting said first valve body at a position blocking fluid communication between said first, second and third ports when said pilot pressure and said feedback pressure balances.

18. An actively controlled suspension system comprising:
a hydraulic cylinder disposed between a vehicular body and a suspension member rotatably supporting a vehicular wheel, said hydraulic cylinder defining an internal space and disposed therein a piston associated with one of said vehicular body and said suspension member via a piston rod, said piston defining a working chamber of variable pressure for varying suspension characteristics;
a hydraulic circuit connecting a pressurized working fluid source to said working chamber, said hydraulic circuit including a first line connected to an outlet of said pressurized working fluid source, a second line connected to an inlet of said pressurized working fluid source for returning working fluid therethrough, and a third line connected to said working chamber;
a proportioning valve assembly disposed within said hydraulic circuit and including
a valve housing defining a first port connected to said first line to receive pressurized working fluid therefrom, a second port connected to said second line for returning working fluid thereto, and a third port connected to said third line for fluid communication with said working chamber for adjusting working fluid pressure in said working chamber;
a first valve body having one end facing a first chamber to be subject to a pilot pressure representative of a desired pressure in said work and the other end facing a second chamber to be subject to a feedback pressure which is fed back from said third port, said first valve body being movable according to a pressure difference between said pilot pressure and said feedback pressure for selectively establishing fluid communication between said first, second and third ports of said valve housing;
a fluid path defining a path extending from said first port to said first chamber and from said first chamber to said second port;
a second valve means associated with said fluid path for providing flow restriction at a predetermined magnitude for generating said pilot pressure within said first chamber; and
a first flow restricting means provided in said fluid path at a position downstream of said first chamber for restricting fluid flow therethrough, said flow restricting means having flow restriction characteristics to serve for first smaller flow restriction for steady fluid flow and for second greater flow restriction for disturbed fluid flow;
an actuator associated with said second valve means controlling a position of said second valve means and adjusting said pilot pressure at a desired value; and
control means for monitoring vehicular attitude change of said vehicular body and for producing a control signal depending upon a monitored magnitude of attitude change for suppressing said attitude change, said control means supplying said control signal to said actuator for operating said actuator to adjust said position of said second valve means.

19. An actively controlled suspension system as set forth in claim 18, wherein said first flow restricting means comprises a multi-stage orifice having a plurality of strip-like members respectively providing a flow restricting orifice, said multi-stage orifice being so designed that an orifice of one of said strip-like members oriented at a most upstream side with respect to fluid flow is effective to provide flow restriction for steady flow and orifices of all of said strip-like members are equally effective for flow restriction for disturbed fluid flow.

20. An actively controlled suspension system as set forth in claim 19, which further comprises a second flow restricting unit disposed in said fluid path at a position upstream of said first chamber, said second flow restricting unit having flow restriction characteristics to serve for first smaller flow restriction for steady fluid flow and for second greater flow restriction for disturbed fluid flow.

21. An actively controlled suspension system as set forth in claim 20, wherein said second flow restricting unit comprises a multi-stage orifice having a plurality of strip-like members respectively providing flow restricting orifice, said multi-stage orifice being so designed that an orifice of one of said strip-like members oriented at a most upstream side with respect to fluid flow is effective to provide flow restriction for steady flow and orifices of all of said strip-like members are equally effective for flow restriction for disturbed fluid flow.

22. An actively controlled suspension system as set forth in claim 18, which further comprises a second flow restricting unit disposed in said fluid path at a position upstream of said first chamber, said second flow restricting unit having flow restriction characteristics to serve for first smaller flow restriction for steady fluid flow and for second greater flow restriction for disturbed fluid flow.

23. An actively controlled suspension system as set forth in claim 22, wherein said second flow restricting unit comprises a multi-stage orifice having a plurality of strip-like members respectively providing a flow restricting orifice, said multi-stage orifice being so designed that an orifice of one of said strip-like members oriented at a most upstream side with respect to fluid flow is effective to provide flow restriction for steady flow and orifices of all of said strip-like members are equally effective for flow restriction for disturbed fluid flow.

24. An actively controlled suspension system as set forth in claim 18, which further comprises first and second springs subjecting biasing forces to said one and the other ends of said first valve body for setting said first valve body at a position blocking fluid communication between said first, second and third ports when said pilot pressure and said feedback pressure balances.

25. An actively controlled suspension system as set forth in claim 18, which further comprises a third flow restricting means provided within said second port for restricting fluid flow therethrough, said third flow restricting means providing flow restriction characteristics for providing greatest flow restriction against a switching frequency of fluid flow direction substantially corresponding to a resonance frequency of said work.

26. An actively controlled suspension system as set forth in claim 18, which further comprises a third flow restricting means provided within said third port for restricting fluid flow therethrough, said third flow restricting means providing flow restriction characteristics for providing greatest flow restriction against a switching frequency of fluid flow direction substantially corresponding to a resonance frequency of said work.

27. An actively controlled suspension system comprising:

a hydraulic cylinder disposed between a vehicular body and a suspension member rotatably supporting a vehicular wheel, said hydraulic cylinder defining an internal space and disposed therein a piston associated with one of said vehicular body and said suspension member via a piston rod, said piston defining a working chamber of variable pressure for varying suspension characteristics;

a hydraulic circuit connecting a pressurized working fluid source to said working chamber, said hydraulic circuit including a first line connected to an outlet of said pressurized working fluid source, a second line connected to an inlet of said pressurized working fluid source for returning working fluid therethrough, and a third line connected to said working chamber;

a proportioning valve assembly disposed within said hydraulic circuit and including a valve housing defining a first port connected to said first line to receive pressurized working fluid therefrom, a second port connected to said second line for returning working fluid thereto, and a third port connected to said third line for fluid communication with said working chamber for adjusting working fluid pressure in said working chamber;

a first valve body having one end facing a first chamber to be subject to a pilot pressure representative of a desired pressure in said work and the other end facing a second chamber to be subject to a feedback pressure which is fed back from said third port, said first valve body being movable according to a pressure difference between said pilot pressure and said feedback pressure for selectively establishing fluid communication between said first, second and third ports of said valve housing;

a fluid path defining a path extending from said first port to said first chamber and from said first chamber to said second port;

a second valve means associated with said fluid path for providing flow restriction at a predetermined magnitude for generating said pilot pressure within said first chamber; and a first flow restricting means provided in at least one of said second and third port for providing flow restriction, said first flow restricting means providing flow restriction characteristics for providing greatest flow restriction against a switching frequency of fluid flow direction substantially corresponding to a resonance frequency of said work;

an actuator associated with said second valve means controlling a position of said second valve means for adjusting said pilot pressure at a desired value; and control means for monitoring vehicular attitude change of said vehicular body and for producing a control signal depending upon a monitored magnitude of attitude change for suppressing said attitude change, said control means supplying said control signal to said actuator for operating said actuator to adjust said position of said second valve means.

28. An actively controlled suspension system as set forth in claim 27, which further comprises a second flow restricting means disposed within said fluid path at a position downstream of said first chamber for restricting fluid flow therethrough, said second flow restricting means having flow restriction characteristics to serve for first smaller flow restriction for steady fluid flow and for second greater flow restriction for disturbed fluid flow.

29. An actively controlled suspension system as set forth in claim 28, wherein said second flow restricting means comprises a multi-stage orifice having a plurality of strip-like members respectively providing a flow restricting orifice, said multi-stage orifice being so designed that an orifice of one of said strip-like members oriented at a most upstream side with respect to fluid flow is effective to provide flow restriction for steady flow and orifices of all of said strip-like members are equally effective for flow restriction for disturbed fluid flow.

30. An actively controlled suspension system as set forth in claim 29, which further comprises a third flow restricting unit disposed in said fluid path at a position upstream of said first chamber, said third flow restricting unit having flow restriction characteristics to serve for first smaller flow restriction for steady fluid flow and for second greater flow restriction for disturbed fluid flow.

31. An actively controlled suspension system as set forth in claim 30, wherein said third flow restricting unit comprises a multi-stage orifice having a plurality of strip-like members respectively providing a flow restricting orifice, said multi-stage orifice being so designed that an orifice of one of said strip-like members oriented at a most upstream side with respect to fluid flow is effective to provide flow restriction for steady flow and orifices of all of said strip-like members are equally effective for flow restriction for disturbed fluid flow.

32. An actively controlled suspension system as set forth in claim 27, which further comprises a third flow restricting unit disposed in said fluid path at a position upstream of said first chamber, said third flow restricting unit having flow restriction characteristics to serve for first smaller flow restriction for steady fluid flow and for second greater flow restriction for disturbed fluid flow.

33. An actively controlled suspension system as set forth in claim 32, wherein said third flow restricting unit comprises a multi-stage orifice having a plurality of strip-like members respectively providing a flow restricting orifice, said multi-stage orifice being so designed that an orifice of one of said strip-like members oriented at a most upstream side with respect to fluid flow is effective to provide flow restriction for steady flow and orifices of all of said strip-like members are equally effective for flow restriction for disturbed fluid flow.

34. An actively controlled suspension system as set forth in claim 27, which further comprises first and second springs subjecting biasing forces to said one and the other ends of said first valve body for setting said first valve body at a position blocking fluid communication between said first, second and third ports when said pilot pressure and said feedback pressure balances.

* * * * *